April 6, 1965    P. J. WEAVER    3,176,552
MULTIPLE SLIDE COPYING MACHINE
Filed June 11, 1963    2 Sheets-Sheet 1
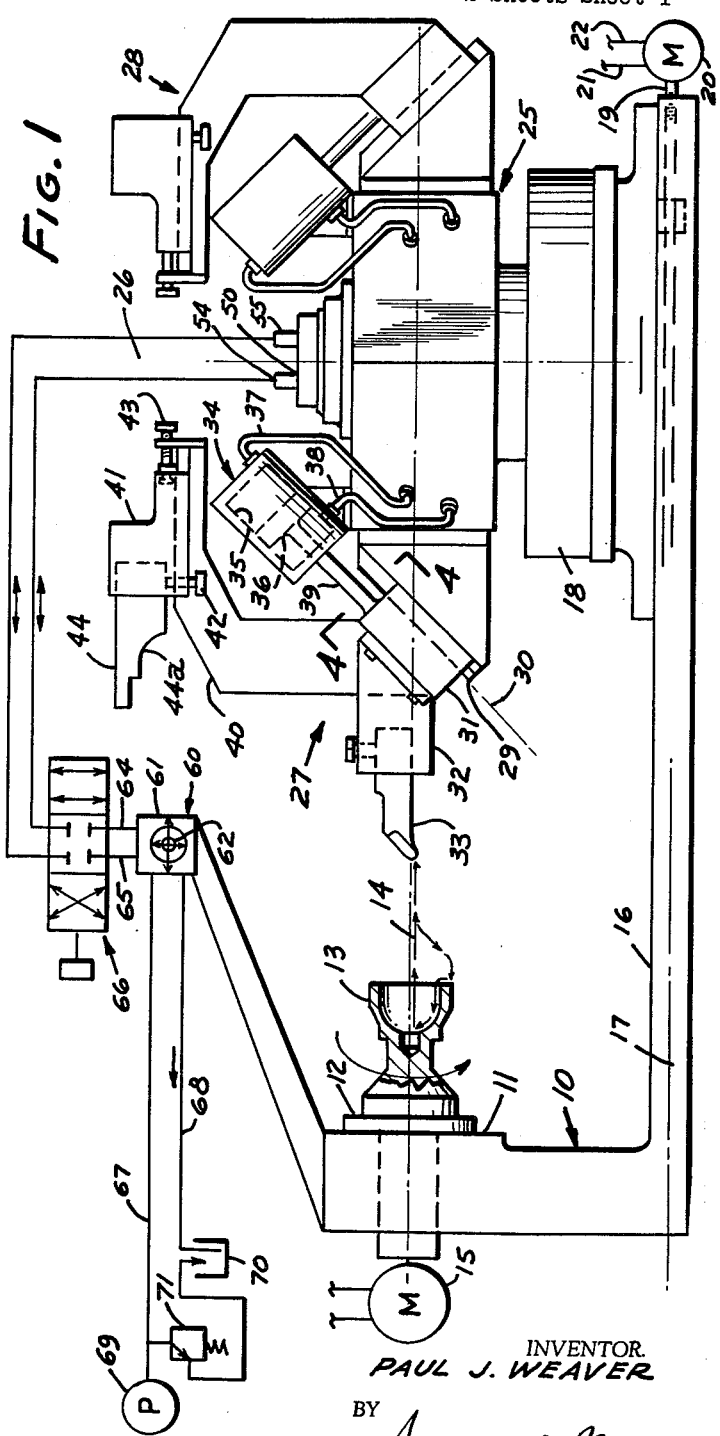
INVENTOR.
PAUL J. WEAVER
BY Angus & Mon
ATTORNEYS.

April 6, 1965 P. J. WEAVER 3,176,552
MULTIPLE SLIDE COPYING MACHINE
Filed June 11, 1963 2 Sheets-Sheet 2
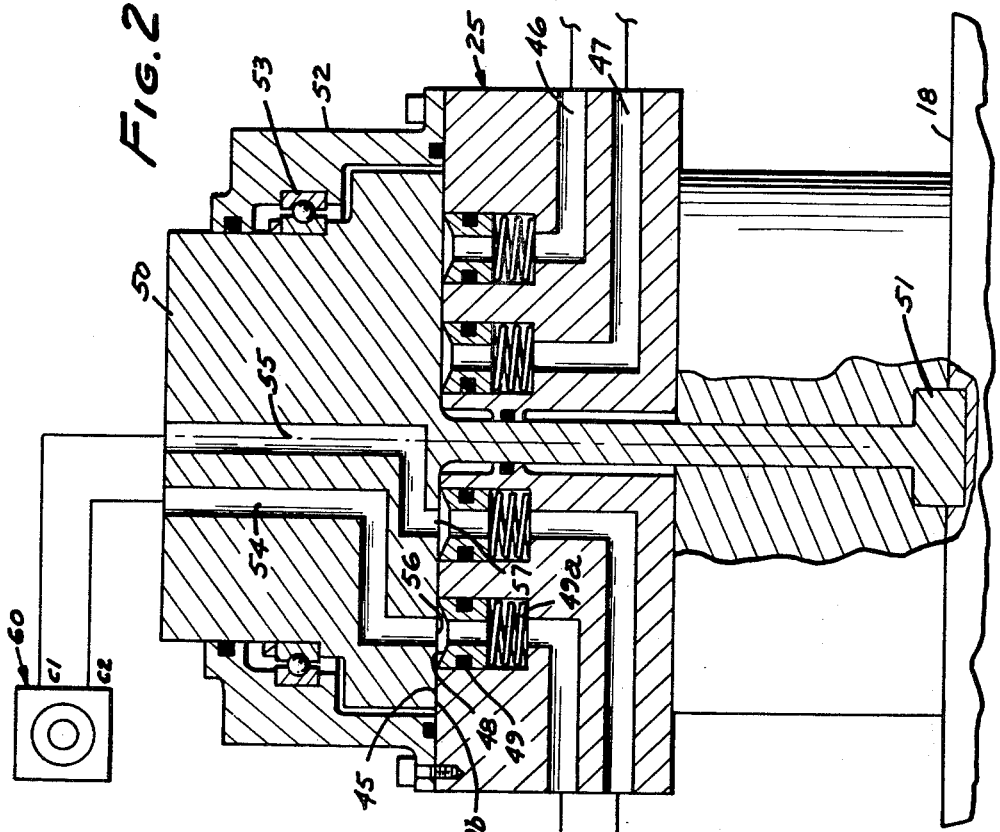
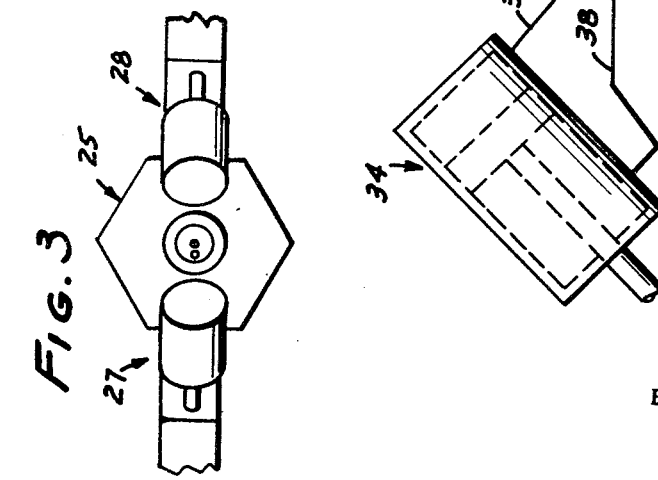
INVENTOR.
PAUL J. WEAVER
BY
ATTORNEYS.

United States Patent Office 3,176,552
Patented Apr. 6, 1965

3,176,552
MULTIPLE SLIDE COPYING MACHINE
Paul J. Weaver, Pasadena, Calif., assignor to True-Trace Corporation, El Monte, Calif., a corporation of Connecticut
Filed June 11, 1963, Ser. No. 286,997
5 Claims. (Cl. 82—14)

This invention relates to contour copying machine tools.

Contour copying machine tools, particularly tracer-controlled lathes and mills, are well known in the art. They ordinarily include means for relatively shifting a cutting tool and a workpiece in accordance with signals received from the interaction between a template and a tracer valve. The template and tracer valve operate fluid or electrical motors in order to accomplish the relative shifting. Common tracer valve-actuated machinery ordinarily provides but a single set of slides for workpiece and templates, and therefore require the substitution and realignment of different tools and templates each time a different cut is to be made, even on the same workpiece. In order to overcome this limitation, attempts have been made to provide for template rails which are able to utilize a plurality of templates in sequence, but this involves a number of problems relating to proper adjustments between them.

In order to attempt to overcome this situation, some attempts have been made to provide for individual tools with individual templates all responsive to the commands of a single tracer valve. This has improved the performance of certain machine tools, but still leaves a significant gap in that it is not applicable to turret lathes wherein the sole available saddle movement is along a longitudinal axis. On such a machine, an effective arrangement requires the provision of more than one slide, and this powered independently of the saddle. Such a combination has never been provided.

A machine according to this invention includes a frame with a saddle slide on this frame which extends along a longitudinal axis. Rotatable means are provided for turning a workpiece on a second axis which is parallel to the longitudinal axis. A saddle is mounted to and is adapted to move longitudinally on the saddle slide in response to power applied to feed means. A rotatable turret is mounted to the saddle which carries a plurality of sets of tool slides, motive means, tool carriers, and template holders. The tool slides and motive means are mounted to the turret. The tool carriers are mounted to the tool slides, and the template holders are mounted to the tool carriers. The tool carriers are adapted to carry respective tools, and the template holders are adapted to carry respective templates.

The sets are angularly spaced around the turret from one another, and their respective axes are disposed non-parallel to the second axis. A tracer valve of the class adapted to select and control the rate of flow of pressure and exhaust fluid to motive means, such as a fluid motor in response to interaction between a tracer stylus and a template, is mounted to the machine tool frame with its stylus so disposed and arranged as to be contacted by a template held in one of the template holders when the turret is set in one registered position so that one of the templates will be held parallel to the longitudinal axis.

A distributor is non-rotatably mounted to the saddle, so as to selectively connect one of the sets to the tracer valve. In the preferred embodiment of the invention, a pair of fluid conduits extends through the distributor and is connected to the tracer valve. These conduits extend to a pair of distributor ports which are registrable with respective pairs of motor supply ports for each fluid motor. In this manner, the turret may be indexed around its angle of rotation, sequentially connecting the tracer valve to appropriate motive means for responding to a selected tool and template.

This invention will be fully understood from the following detailed description and the accompanying drawings in which:

FIG. 1 is a side elevation, partly in schematic notation, showing the presently preferred embodiment of the invention;

FIG. 2 is a cross-section showing a portion of FIG. 1;

FIG. 3 is a top view of a portion of FIG. 1;

FIG. 4 is a cross-section taken at line 4—4 of FIG. 1; and

FIG. 5 is a fragmentary elevation of a tracer valve utilized in the invention.

The presently preferred embodiment of the invention is shown in FIG. 1, which illustrates a typical turret lathe having a machine tool frame 10 with a head stock 11 having collet means 12 for holding and rotating a workpiece 13 on axis 14 (sometimes called the "second axis"). A motor 15 turns the collet means relative to the machine tool frame.

The frame includes a saddle slide 16 which extends along a longitudinal axis 17 parallel to axis 14. A saddle 18 rests and slides upon the slide in the longitudinal direction. The saddle is powered to make its sliding movement by a lead screw 19 rotated by motor 20. Motor 20 may be a fluid-actuated type fed by conduits 21, 22, its speed and direction, and therefore the speed and direction of saddle motion, being controlled by the direction and rate of flow of the fluid passed through these conduits.

The saddle carries a turret 25, which is rotatable around upright axis 26. The indexable rotation of such turrets to selected angular positions is well known in the art, and requires no detailed disclosure here. Sets 27, 28 of operative components are provided, only set 27 being disclosed in detail herewith, it being understood that set 28 is like it. More than two sets may be provided, if desired, the turret being indexable to a unique position for each set.

Set 27 includes a tool slide 29 extending along an axis 30 which is non-parallel to axes 14 and 17. In fact, it preferably makes an angle of 45° to each of them when in the indexed position shown in FIG. 1, at which position the set is operative with axis 30 in the same plane as the sheet of FIG. 1, and of axes 14 and 17. Tool slide 29 forms a slide to mount a tool carrier 31 for slidable movement.

The tool carrier carries a tool holder 32, which in turn holds a cutting tool 33. A motive means 34, preferably a fluid motor, is mounted to the turret. It includes a cylinder 35, in which a piston 36 is slidably shiftable. Motor supply conduits 37, 38 are connected to the cylinder on opposite sides of the normal operating positions of the piston. A rod 39 interconnects the piston with the tool carrier, so that movement of the piston results in movement of the tool holder.

A bracket 40 is also mounted to the tool carrier, and a template holder 41 is mounted to this bracket. The template holder includes vertical and horizontal adjustment means 42, 43 for adjustably shifting a template 44 mounted thereto. The template has a contour 44a to be reproduced on the workpiece.

Motor supply conduits 37 and 38 pass through the turret and open onto an upper surface 45 thereof. Similar motor supply conduits 46, 47 are provided for set 28. A shear seal member 48 is mounted in each of the conduits at the upper surface. They are surrounded by an O-ring 49 and biased in an upward direction by a spring 49a so as to make a firm shear seal contact with a lower surface 49b of a distributor 50, which distributor is non-rotatably keyed to the saddle by key 51. The distributor is concentric with the upright axis 26.

The distributor does not rotate relative to the upright axis. It is surrounded by, and aids in supporting, the turret by a ring 52 and bearing 53 with seals as shown. The distributor has a pair of conduits 54, 55 which have openings 56, 57 in lower surface 49b where they will register with the openings of the motor supply conduits of a set when the respective set is in the operative position shown for set 27 in FIG. 1. There is registration for only one set at a time.

A tracer valve 60 is mounted to the frame, which tracer valve includes, as is shown in FIG. 5, a body 61 mounted to the frame, and a universally pivoted stylus 62. Pivotal movement of the stylus changes the adjustment of internal valve elements so as to select and control the rate of fluid flow through conduits 64 and 65, which are connectable to conduits 54 and 55 through a selector valve 66. This selector valve determines which of conduits 64 and 65 is connected to respective conduits 54 and 55 for adjusting the direction which the tool and template will seek, in this case toward or away from the second axis. This selection enables either boring or external turning operations to be performed. The tracer valve includes pressure inlet 67 and exhaust outlet 68. Inlet 67 receives pressure from pump 69 and outlet 68 discharges into reservoir 70. A pressure relief valve 71 limits the pressure in the pressure line.

The construction and operation details of a suitable tracer valve require no description here. They can be found in Roy Rosebrook Patent No. 2,958,340, issued November 1, 1960. Suffice it to say that in operation, the template and stylus seek each other, thereby relatively positioning the tool and workpiece. Then when the contour of the template deflects the stylus of the tracer valve, the effect will be to cause itself to back off until a null position is reached. These movements enable the in and out motions of the tools to be regulated as the tool and template are fed along the longitudinal axis.

Should it be desired to coordinate the rates of movement of the tool in more than one direction, which is to say, to vary the rate of feed with the rate of motion within one of the sets, then one set of segments of the tracer valve in Paul J. Weaver Patent No. 3,055,393, issued September 25, 1962, may be connected to the feed motor, and the other to the distributor, so as to coordinate its rate with that of the selected set.

This invention thereby provides a tracer attachment for a standard turret lathe in which any number of sets of slides may be provided on the turret with their associated tools and templates, all of which can be placed under the control of a single tracer valve, thereby saving the large cost of individual tracer valves for each set of slides. This device may be utilized with the feed at a constant rate, or it may be coordinated with it as aforesaid, thereby utilizing a plurality of slides in each set, the saddle slide then forming one of the slides of each set.

This invention is not to be limited by the embodiment shown in the drawings and described in the description which is given by way of example and not of limitation, but only in accordance with the scope of the appended claims.

I claim:

1. In combination: a machine tool frame; a saddle slide on said frame extending along a longitudinal first axis; rotatable means on said frame for turning a workpiece on a second axis which is parallel to the longitudinal axis; a saddle mounted to and adapted to move longitudinally along said slide; feed means adapted to move the saddle toward and away from the workpiece along said longitudinal axis; a turret mounted to said saddle and rotatable around a third axis which is non-parallel to the first and second axes; a plurality of sets of tool slides, motive means, tool carriers, and template holders, the tool slides and motive means being mounted to the turret, the tool carriers and template holders being mounted to respective tool slides, the tool carriers being adapted to carry respective tools, and the template holders being adapted to carry respective templates, the tool slides being angularly spaced around the turret from one another and their axes being disposed non-parallel to the second axis; a tracer valve of the class adapted to select and control the direction and rate of flow of pressure and exhaust fluid to a motive means in response to interaction between a tracer stylus and a template, said tracer valve being mounted to the machine tool frame with its stylus so disposed and arranged as to be contacted by a template held in one of said template holders when the turret is set in one registered position wherein one of the templates will be held parallel to the longitudinal axis; a distributor non-rotatably mounted to the saddle; a pair of fluid conduits extending through said distributor interconnecting the tracer valve to a pair of distributor ports; and a pair of supply conduits for each motive means mounted to the turret and adapted to join to the distributor ports only when the respective set is in the said registered position, whereby indexed rotation of the turret around the third axis brings a respective set into registered position so as to make the respective cutting tool effective upon the workpiece and the respective template operative relative to the tracer valve, the distributor and turret then serving to register the respective supply conduits to the distributor ports, thereby to make appropriate fluid conduit connections for operating the selected set under control of the tracer valve.

2. A combination according to claim 1 in which the motive means comprises a fluid motor.

3. A combination according to claim 1 in which the tracer valve is selectively connectible both to the respective ones of the set and to the feed means for coordinating their movements.

4. A combination according to claim 1 in which the distributor and turret include shear-slidable surfaces, the distributor ports opening onto the surface of the distributor, and the supply conduits opening onto the surface of the turret, the said ports and conduits registering only when the respective sets are in the said registered position.

5. A combination according to claim 4 in which selector valve means is provided for reversing the connections of the tracer valve to the distributor ports.

References Cited by the Examiner
UNITED STATES PATENTS 2,739,495 3/56 Johnson _____ 82—14 XR
2,798,395 9/57 Johnson _____ 82—14.1

LEON PEAR, *Primary Examiner.*